(12) United States Patent
Xia

(10) Patent No.: US 8,650,346 B2
(45) Date of Patent: Feb. 11, 2014

(54) METHOD AND BUS SYSTEM FOR EQUALIZING DATA INFORMATION TRAFFIC AND DECODER

(75) Inventor: Jing Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 13/250,458

(22) Filed: Sep. 30, 2011

(65) Prior Publication Data

US 2012/0084473 A1  Apr. 5, 2012

(30) Foreign Application Priority Data

Sep. 30, 2010  (CN) .......................... 2010 1 0505992

(51) Int. Cl.
*G06F 13/42* (2006.01)
*G06F 3/00* (2006.01)
*G06F 5/00* (2006.01)

(52) U.S. Cl.
USPC ........................................... 710/105; 710/38

(58) Field of Classification Search
CPC .... G06F 13/38; G06F 3/0635; G06F 13/4022
USPC .................................................... 710/105, 38
See application file for complete search history.

(56) References Cited

U.S. PATENT DOCUMENTS

| | | | | |
|---|---|---|---|---|
| 4,309,691 A | * | 1/1982 | Castleman | 382/303 |
| 5,987,008 A | * | 11/1999 | Simpson et al. | 370/236 |
| 6,208,644 B1 | * | 3/2001 | Pannell et al. | 370/389 |
| 7,868,654 B1 | * | 1/2011 | Han et al. | 326/38 |

(Continued)

FOREIGN PATENT DOCUMENTS

| | | |
|---|---|---|
| CN | 1538665 A | 10/2004 |
| CN | 101751361 A | 6/2010 |

(Continued)

OTHER PUBLICATIONS

Heath, J.R.; Ramamoorthy, S.; Stroud, C.E.; Hurt, A.D., "Modeling, design, and performance analysis of a parallel hybrid data/command driven architecture system and its scalable dynamic load balancing circuit," Circuits and Systems II: Analog and Digital Signal Processing, IEEE Transactions on , vol. 44, No. 1, pp. 22,40, Jan. 1997.*

(Continued)

*Primary Examiner* — Faisal M Zaman
(74) *Attorney, Agent, or Firm* — Brinks Gilson & Lione

(57) ABSTRACT

In the field of integrated circuit (IC) design, a method and a bus system for equalizing data information traffic and a decoder are provided. The method includes: receiving data information sent by a device, and allocating at least two transmission interfaces for the data information according to a decoding result of decoding a designated bit in the data information, where the data information carries a device ID, and the designated bit position occupied at least one bit in the device ID; judging whether the data information traffic of the at least two transmission interfaces is balanced; and when the data information traffic of the at least two transmission interfaces is not balanced, switching the designated bit position, and decoding the designated bit after switching, so as to balance the traffic of the at least two transmission interfaces. The bus system includes an interface allocation module, a traffic judging module and a bit position switching module. The decoder includes a decoding module and a designated bit position switching module.

13 Claims, 6 Drawing Sheets

(56) References Cited

U.S. PATENT DOCUMENTS

| | | |
|---|---|---|
| 2002/0186656 A1* | 12/2002 | Vu .................................. 370/229 |
| 2003/0189938 A1* | 10/2003 | Beshai ........................... 370/396 |
| 2005/0213693 A1* | 9/2005 | Page ............................... 375/354 |
| 2007/0036162 A1* | 2/2007 | Tingle et al. ................... 370/392 |
| 2009/0240897 A1* | 9/2009 | Kajigaya ........................ 711/149 |
| 2009/0327647 A1* | 12/2009 | Ingle et al. .................... 711/207 |
| 2010/0142975 A1* | 6/2010 | Ivry ............................... 398/182 |
| 2010/0161842 A1 | 6/2010 | Shan et al. |
| 2011/0004707 A1* | 1/2011 | Spry et al. ........................ 710/38 |
| 2011/0004712 A1* | 1/2011 | Honda ............................. 710/74 |
| 2013/0159593 A1* | 6/2013 | Yeung ........................... 710/316 |

FOREIGN PATENT DOCUMENTS

| | | | | |
|---|---|---|---|---|
| JP | 11250668 A | * | 9/1999 | ............. G11C 11/41 |
| JP | 2000091967 A | * | 3/2000 | ............. H04B 7/005 |
| JP | 2001136208 A | * | 5/2001 | ............. H04L 12/56 |
| JP | 2007180891 A | * | 7/2007 | ............. H04L 12/56 |
| WO | WO 2008075336 A2 | * | 6/2008 | ............. H04L 12/56 |

OTHER PUBLICATIONS

Hye-Seon Maeng; Hyoun-Su Lee; Tack-Don Han; Sung-Bong Yang; Shin-Dug Kim, "Dynamic load balancing of iterative data parallel problems on a workstation cluster," High Performance Computing on the Information Superhighway, 1997. HPC Asia '97, pp. 563,567, Apr. 28-May 2, 1997.*

Rajavel, R., "De-Centralized Load Balancing for the Computational Grid environment," Communication and Computational Intelligence (INCOCCI), 2010 International Conference on , pp. 419,424, Dec. 27-29, 2010.*

ARM®, AMBA®AXI Protocol, v1.0, Specification, 2003.

Chinese Patent No. 101950279, issued on Sep. 19, 2012, granted in corresponding Chinese Patent Application No. 201010505992.5.

* cited by examiner

METHOD AND BUS SYSTEM FOR EQUALIZING DATA INFORMATION TRAFFIC AND DECODER

CROSS-REFERENCE TO RELATED APPLICATIONS

This application claims priority to Chinese Patent Application No. 201010505992.5, filed on Sep. 30, 2010, which is incorporated herein by reference in its entirety.

FIELD OF THE INVENTION

The present invention relates to the field of integrated circuit (IC) design, and more particularly to a method and a bus system for equalizing data information traffic and a decoder.

BACKGROUND OF THE INVENTION

The Advanced Extensible Interface (AXI) is a third-generation high-performance system bus developed by the ARM Company based on the Advanced Peripheral Bus (APB) and the Advanced High-performance Bus (AHB).

The AXI bus may be built as various complex on-chip bus structures, including the topology types of shared bus and crossbar architecture, so as to complete on-chip interconnection between multiple master devices and multiple slave devices. With the continuous progress of the processor and the bandwidth of service processing, the AXI bus crossbar is also confronted with the problem of insufficient bandwidth, especially on a Dial-on-Demand Routing (DDR) interface, a DDR serves as an independent slave device, and even if the bit width is 64 bits, the bandwidth that can be achieved at the frequency of 400 MHz is 51.2 Gbps at most with a read bandwidth of only 25.6 Gbps, which cannot meet the requirements of some high-end applications. In order to further improve the performance and increase the DDR bandwidth without adding additional hardware costs, a solution of increasing the number of the AXI interfaces of the DDR is generally adopted to solve the problem. The DDR interface is 64 bits, the matching bandwidth of the AXI interface is 128 bits according to a double sampling rate, two AXI interfaces of 64-bit width are adopted to access the DDR, and the total bandwidth is equivalent to the bandwidth of a single 128-bit AXI interface, and is double of that of a single 64-bit AXI interface, while the system bus still maintains the width of 64 bits, thereby almost having no influence on the clock frequency or the cost.

After analyzing the prior art, the inventor finds that the prior art at least has the following disadvantages.

Although the DDR interface is extended in the prior art, when receiving data information from multiple master devices, the slave device cannot allocate the data information traffic to the multiple transmission interfaces of the DDR as evenly as possible, so that the data information transmission efficiency is low, the processing speed is low, and waste of resources is caused.

SUMMARY OF THE INVENTION

Embodiments of the present invention provide a method and a bus system for equalizing data information traffic and a decoder. The technical solutions are as follows.

A method for equalizing data information traffic includes:
receiving data information sent by a device, and allocating at least two transmission interfaces for the data information according to a decoding result of decoding a bit value on a designated bit position in the data information, where the data information carries a device ID, and the designated bit position occupies at least one bit in the device ID;

judging whether the data information traffic of the at least two transmission interfaces is balanced; and when the data information traffic of the at least two transmission interfaces is not balanced, switching the designated bit position, and decoding a bit value on the designated bit position after switching, so as to balance the traffic of the at least two transmission interfaces.

A method for equalizing data information traffic includes:
decoding a bit value on a designated bit position in data information, and sending a decoding result to a bus system, so that the bus system allocates transmission interfaces for the data information according to the decoding result; and when the data information traffic of the transmission interfaces of the bus system is not balanced, switching the designated bit position under the control of the bus system, and decoding a bit value on the designated bit position after switching, so as to balance the data information traffic of the transmission interfaces.

A bus system for equalizing data information traffic includes:

an interface allocation module, configured to allocate transmission interfaces for data information according to a decoding result of decoding a bit value on a designated bit position in the data information, where the data information carries a device ID, and the designated bit position occupies one bit in the device ID;

a traffic judging module, configured to judge whether the data information traffic of the transmission interfaces is balanced; and a bit position switching module, configured to switch the designated bit position when the data information traffic of the transmission interfaces is not balanced, and decode the designated bit after switching, so as to balance the traffic of the transmission interfaces.

A decoder includes:

a decoding module, configured to decode a bit value on a designated bit position in data information, and send a decoding result to a bus system, so that the bus system allocates transmission interfaces for the data information according to the decoding result; and a designated bit position switching module, configured to switch the designated bit position under the control of the bus system when the data information traffic of the transmission interfaces of the bus system is not balanced, so that the decoding module decodes a bit value on the designated bit position after switching, so as to balance the traffic of the transmission interfaces.

The technical solutions of the embodiments of the present invention have the following beneficial effects.

The transmission interfaces are allocated for the data information according to the decoding result of decoding the designated bit in the received data information, and the designated bit position is changed when the traffic of the transmission interfaces is not balanced, and interface allocation is performed by using the decoding result of the designated bit after changing, so as to balance the data information traffic, so that the present invention does not involve the modification of the master devices, and can achieve even allocation of the data information traffic in at least two transmission channels without significantly increasing the cost. As a result, the transmission efficiency is improved, the data processing speed is increased, and resources conservation is achieved.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

In order to make the objectives, technical solutions and advantages of the present invention more comprehensible, the present invention is described in detail below with reference to the accompanying drawings.

Before introducing the method and the bus system for equalizing data information traffic according to the present invention, the elementary knowledge used in the present invention is introduced.

The System on Chip (SoC) means that it is a product, is an IC having a dedicated target, and includes a complete system and all contents of embedded software.

Figure 1:
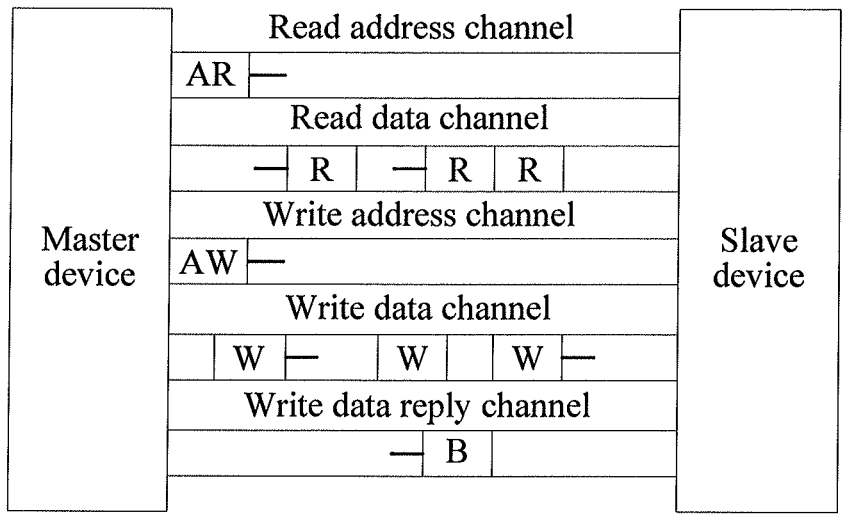
FIG. 1 shows an architecture of an AXI protocol according to an embodiment of the present invention.

AXI refers to a bus protocol of packet-based multi-channel transmission proposed by ARM. The architecture of the AXI protocol is shown in FIG. 1, the AXI transmission is performed on the basis of five transmission channels, and in view of an upper layer protocol, AXI is to divide the transmission into five packets according to directions, namely, a read request packet (AR) for read operation, a read data and reply packet (R), a write request packet (AW) for write operation, a write data packet (W), and a write reply packet (B), where R, AW and W packets are sent from a master device to a slave device, and R and B are returned from the slave device to the master device. A typical read operation of the AXI includes one AR and several Rs, and typical write operation of AXI includes one AW, several Ws and one B. One transmission includes multiple packets, which are identified by the same ID number.

The master device refers to a module that initiates transmission on the bus.

The slave device refers to a module that responds to the transmission on the bus.

The packet refers to the smallest transmission unit on the AXI bus, and may be sent from the master device to the slave device or from the slave device to the master device.

The read request packet (AR) refers to a read request packet initiated by the master device to the slave device on the AXI bus.

The write request packet (AW) refers to a write request packet initiated by the master device to the slave device on the AXI bus.

The write data packet (W) refers to a write data packet initiated by the master device to the slave device on the AXI bus.

The read data and reply packet (R) refers to a read data and reply information packet returned by the slave device to the master device on the AXI bus.

The write reply packet (B) refers to a write reply information packet returned by the slave device to the master device on the AXI bus.

A Tag ID refers to information on the packet marked by the AXI bus, where multiple packets in one transmission are identified by the same ID number.

Outstanding transmission refers to that in the AXI protocol, next transmission can be initiated after a previous transmission request is sent but the transmission is not completed, where the dependence between the packets is very small, and no fixed phase relation exists, so high-efficiency outstanding transmission is supported, that is, the master device or the slave device can have several operations that are ongoing but not yet completed, and the sequence control is performed by means of ID. Outstanding has the following characteristics.

1. If Rs returned from the slave device have the same ID number, the group sequence of Rs (group refers to one or more Rs corresponding to one read operation AR) is the same as the sequence of ARs received by the slave device, where the ARs have the same ID number as the Rs; if the Rs have different ID numbers, the sequence of Rs may be interleaved randomly.

2. In the case of not supporting interleave (most of the cases), whether the Ws received by the slave device have the same ID number or not, the group sequence of Ws (group refers to one or more Rs corresponding to one read operation AR) must be the same as the sequence of AWs received by the slave device.

3. If the Bs returned by the slave device have the same ID number, the sequence of the Bs is the same as the sequence of AWs of the ID number received by the slave device.

Out-of-Order transmission refers to that in the AXI protocol, the slave device may return Bs and Rs out of order rather than in the sequence of receiving ARs and AWs, where the Bs and the Rs have different ID numbers.

Write interleave refers to that in the AXI protocol, among the Ws that have different ID numbers and are sent by the master device, except the first W, the subsequent Ws may be sent out of order rather than in the sequence of sending AWs; however, normal designs do not support the characteristic.

The AXI bus may be built as various complex on-chip bus structures, including the topology types of shared bus and crossbar, so as to complete on-chip interconnection between multiple master devices and multiple slave devices. The most typical interconnection mode is an AXI bus of the crossbar structure, the crossbar is referred to as a crossbar switch matrix, and if multiple crosspoints are closed simultaneously, data transmission can be performed between multiple different master devices and slave devices, which ensures internal non-blocking transmission of the crossbar, that is, all ports exchange data at a line rate simultaneously. In theory, if an AXI bus of 200 MHz and 32-bit data width has a bandwidth of 12.8 Gbps, the crossbar having N master interfaces may support a bandwidth of up to 12.8×N Gbps. The present invention is mainly described with the crossbar structure, and the application on the shared bus structure is similar to that on the crossbar, which will not be described additionally herein.

Figure 2:
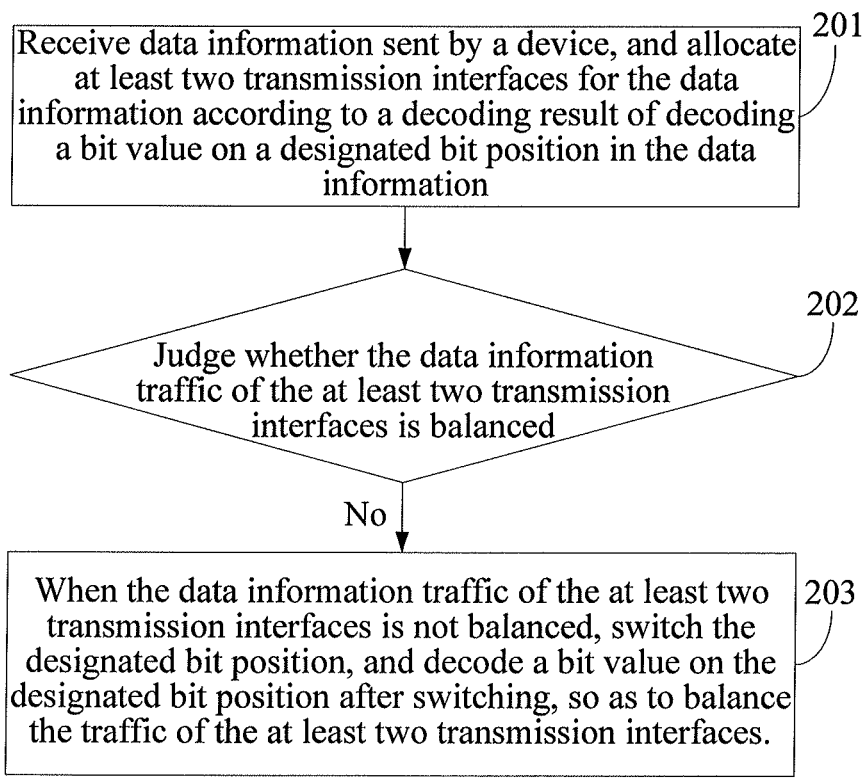
FIG. 2 is a flow chart of a method for equalizing data information traffic according to an embodiment of the present invention.

In order to improve the transmission efficiency and increase the data information processing speed, an embodiment of the present invention provides a method for equalizing data information traffic. As shown in FIG. 2, the method includes the following steps.

201: Receive data information sent by a device, and allocate at least two transmission interfaces for the data information according to a decoding result of decoding a bit value on a designated bit position in the data information, where the data information carries a device ID, and the designated bit position occupies at least one bit of the device ID.

202: Judge whether the data information traffic of the at least two transmission interfaces is balanced.

203: When the data information traffic of the at least two transmission interfaces is not balanced, switch the designated bit position, and decode a bit value on the designated bit position after switching, so as to balance the traffic of the at least two transmission interfaces.

The AXI interfaces are allocated for the data information according to the decoding result of decoding the designated bit in the received data information, and the designated bit position is changed when the traffic of the transmission interfaces is not balanced, and interface allocation is performed by using the decoding result of the designated bit after changing, so as to balance the data information traffic, so that the present invention does not involve the modification of the master devices, and can achieve even allocation of the data information traffic in two channels of the DDR without significantly increasing the cost. As a result, the transmission efficiency is improved, the data processing speed is increased, and resources conservation is achieved.

Figure 3:
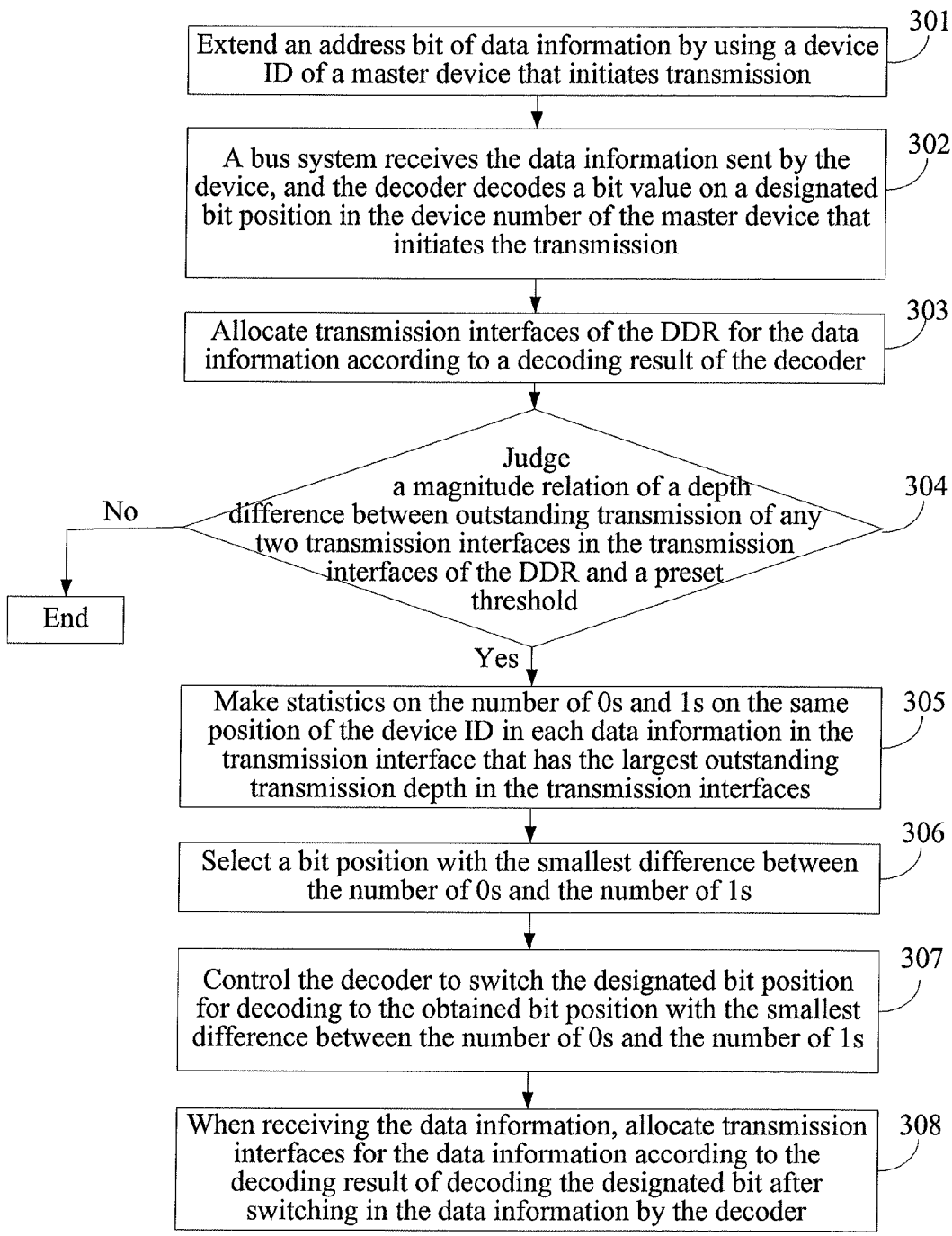
FIG. 3 is a flow chart of a method for equalizing data information traffic according to an embodiment of the present invention.

Furthermore, in order to improve the transmission efficiency and increase the data information processing speed, an embodiment of the present invention provides a method for equalizing data information traffic, where a case that a receiving device is a DDR is taken as an example, and the DDR includes at least two transmission interfaces. In the embodiment of the present invention, a case that the DDR has two transmission interfaces and an external decoding device is a decoder is taken as an example for illustration. As shown in FIG. 3, the method includes the following steps.

301: Extend an address bit of data information by using a device ID of a master device that initiates transmission.

Specifically, a device number of the master device that initiates the transmission is written into the address bit of the data information, so as to obtain an extended address bit.

The device ID includes a master device number and/or an internal data stream number of a master device, and the internal data stream number of the master device is a number obtained by numbering according to specific applications such as the progress quantity in the master device.

302: A bus system receives the data information sent by the device, and the decoder decodes a bit value on a designated bit position in the device number of the master device that initiates the transmission, where the device ID of the master device is in the extended address bit in the data information.

Furthermore, the designated bit position uses the highest-order bit position of the ID number by default when the data transmission is started. Optionally, the designated bit position herein may be other bit position in the ID number.

It should be noted that, the decoder is an external decoder. As the common internal decoders in the crossbar in the industry cannot dynamically change the decoding address, in the embodiment of the present invention, an external decoder is selected for decoding, so as to improve the flexibility of decoding.

303: Allocate transmission interfaces of the DDR for the data information according to a decoding result of the decoder.

It should be noted that, in the process of allocating transmission interfaces for the data information transmitted to the DDR, one bit position (a feature bit position) in the extended address bit position of the ID is selected for decoding; and other slave device ports may decode the address before the ID is extended, regardless of the changes of the extended address bit of the ID.

For example, it is assumed that the ID has 2 bits, the original decoding of the DDR has a 2 G space of 0x00000000-0x7FFFFFF, and the original decoding of the slave device has 0x80000000-0x90000000. After the ID is extended, if two transmission interfaces of the DDR adopt low-order bit decoding, 0x100000000-0x17FFFFFF and 0x300000000x0x37FFFFFF are decoded to one interface, and 0x000000000-0x07FFFFFF and 0x200000000-0x27FFFFFF are decoded to another transmission interface; if high-order bit decoding is adopted, 0x100000000-0x17FFFFFF and 0x000000000-0x07FFFFFF are decoded to one transmission interface, and 0x300000000-0x37FFFFFF and 0x200000000-0x27FFFFFF are decoded to another transmission interface; and the decoding address of the slave device includes four address segments 0x080000000-0x090000000, 0x180000000-0x190000000, 0x280000000-0x290000000, 0x380000000-0x390000000.

Optionally, the allocating transmission interfaces of the DDR for the data information according to the decoding result of the decoder may be allocating the transmission interfaces of the DDR for the data information randomly or according to a preset rule, for example, allocating the transmission interfaces of the DDR for the data information according to the ID interface number.

304: Judge a magnitude relation of a depth difference between outstanding transmission of any two transmission interfaces in the transmission interfaces of the DDR and a preset threshold, and if the depth difference is greater than or equal to the preset threshold, step 305 is performed; if the depth difference is less than the preset threshold, the data information traffic of the transmission interfaces is balanced, and the step is ended; it should be understood that, if the depth difference is equal to the preset threshold, it can be set that the data information traffic of the transmission interfaces is balanced, and the step is ended.

Preferably, when the number of the transmission interfaces of the DDR is two, the depth difference between outstanding transmission of the two interfaces is compared, and when the number of the transmission interfaces of the DDR is more than two, any two interfaces may be combined for comparison, for example, if there are three interfaces, any two of the three interfaces are combined to form three groups, a group whose depth difference is greater than or equal to the preset threshold and is the largest depth difference are subjected to the processing in step 305. It can be understood that, the depth difference between outstanding transmission of the two transmission interfaces is the difference between the quantities of requests initiated by the two transmission interfaces to the slave device, and the request herein may include one or more of a read request packet, a write request packet, and other request packets. The difference between the quantities of requests is the difference between the quantities of transmission request packets of the two interfaces.

It can be understood that, whether the data information traffic of the at least two transmission interfaces is balanced may also be judged according to the difference between the actual data traffic transmitted by the two interfaces, for example, one or more of data traffic including actual write data traffic, read data traffic and read and write data traffic. For example, a method of monitoring the traffic by using a monitor may be used to determine whether the traffic is balanced. If the difference between the data information traffic of the two transmission interfaces is greater than or equal to the preset threshold, the data information traffic of the transmission interfaces is not balanced; and if the difference between the data information traffic of the two transmission interfaces is less than the preset threshold, the data information traffic of the transmission interfaces is balanced. After acquiring the information, the monitor can adjust the traffic according to precisely obtained real-time traffic and traffic distribution of the two ports. However, the addition of the monitor needs additional logic resources.

Outstanding transmission refers to that in the AXI protocol, next transmission can be initiated after a previous transmission request is sent but the transmission is not completed, where the dependence between the packets is very small, and no fixed phase relation exists, so high-efficiency outstanding transmission is supported, that is, the master device or the slave device can have several operations that are ongoing but not yet completed, and the sequence control is performed by means of ID.

It should be noted that, the step is a procedure of monitoring the traffic of the AXI interfaces of the DDR according to the depth of outstanding transmission of the transmission interfaces, and the transmission interface with the largest depth is the transmission interface that currently has the highest bandwidth demand.

305: Make statistics on the number of 0s and 1s on the same position of the device ID in each data information in the transmission interface that has the largest outstanding transmission depth in the transmission interfaces.

For example, a certain transmission interface has three pieces of data information in outstanding transmission, device IDs in the three pieces of data information are 101010, 101110 and 101100, and after statistics are made from high-order to low-order bits, the statistical result is that, on a first-order bit position there are three 1s, on a second-order bit position there are three 0s, on a the third-order bit position there are three 1s, and so on.

In the embodiment of the present invention, this step is to judge which master device has the larger traffic by using the device ID of the data information in outstanding transmission, so as to adjust the traffic.

306: Select a bit position with the smallest difference between the number of 0s and the number of 1s.

In the embodiment of the present invention, the example in step 305 is used for description, and the statistical result is that, on the first-order bit position there are three 1s, on a second-order bit position there are three 0s, on a third-order bit position there are three 1s, on a fourth-order bit position there are two 1s and one 0, on a fifth-order bit position there are two 1s and one 0, on a sixth-order bit position there are three 0s; therefore, the difference between the number of 0s and the number of 1s at the fourth-order bit position and the difference between the number of 0s and the number of 1s the fifth-order bit position are the smallest.

307: Control the decoder to switch the designated bit position for decoding to the obtained bit position with the smallest difference between the number of 0s and the number of 1s.

Persons of ordinary skill in the art can know that, in the design of the AXI protocol, in step 305 to step 306, a bit on the same position of the ID of each transmission in all the IDs of outstanding transmission is searched, to find out the bit position with the smallest difference between the number of 0s and the number of 1s, and if multiple bit positions have the smallest difference, any one of the bit positions can be selected.

Optionally, in this step, in some special cases, for convenience of implementation, the bit position with the smallest difference may not be adopted, and the decoder may also be controlled to switch the designated bit position used for decoding to the obtained bit position with the second smallest difference between the number of 0s and the number of 1s.

308: When receiving the data information, allocate transmission interfaces for the data information according to the decoding result of decoding, by the decoder, the designated bit after switching in the data information.

Figure 4:
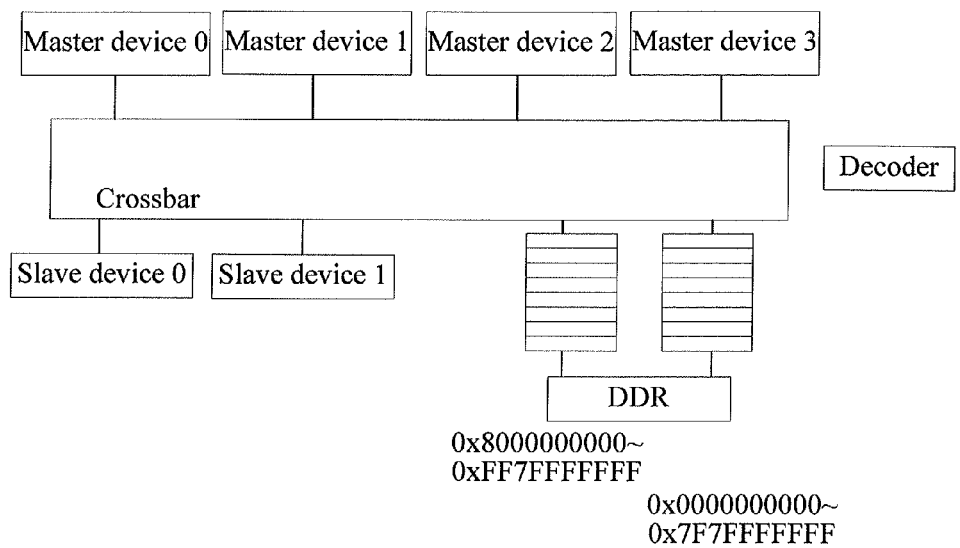
FIG. 4 is a schematic diagram of an example of a method for equalizing data information traffic according to an embodiment of the present invention.
Figure 5:
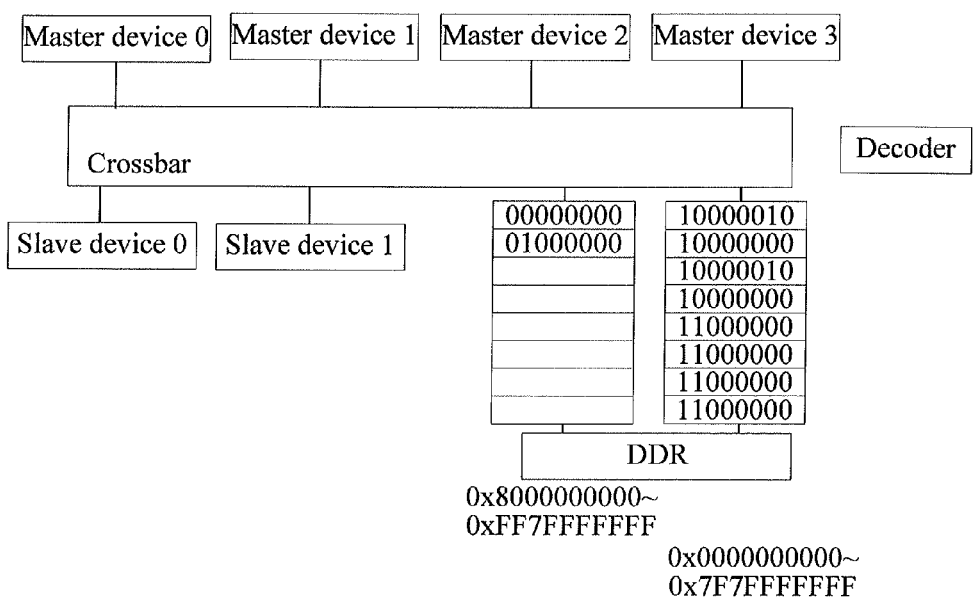
FIG. 5 is another schematic diagram of an example of a method for equalizing data information traffic according to an embodiment of the present invention.
Figure 6:
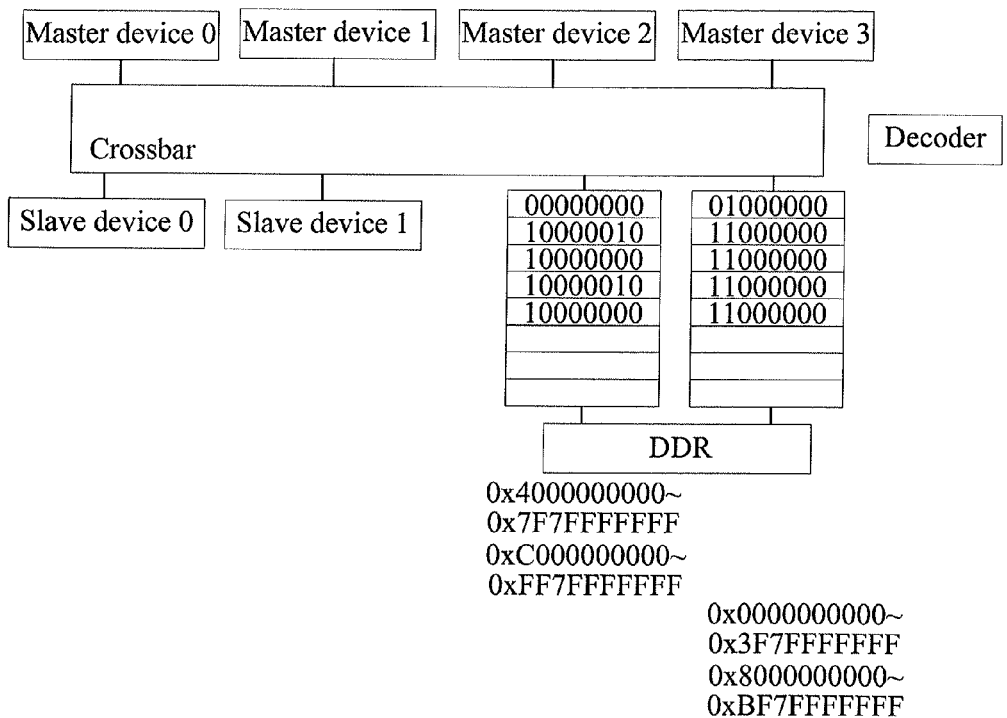
FIG. 6 is still another schematic diagram of an example of a method for equalizing data information traffic according to an embodiment of the present invention.

For example, the typical application of the embodiment of the present invention in the crossbar (DDR has two AXI interfaces) is taken as an example for description. As shown in FIG. 4, the method according to the embodiment of the present invention is used to access two AXI interfaces of the DDR for reading and writing DDR, and decoding is performed on the basis of a 32-bit address signal of the system. The crossbar has four master devices and two slave devices, the length of the original ID of each of the master devices is 6 bits, and the master device is coded by the crossbar as 2 bits, so the length of the ID of each of the master devices on the crossbar is 8 bits. The 8-bit ID of each of the master device is added into an address bit, and the extended address is decoded by the external decoder, that is, the decoding address is 8+32=40 bits, and the addresses of Slave 0 and Slave 1 are decoded and extended to 64 bits, that is, regardless of the largest 8-bit value, decoding is performed according to the low-order 32-bit original address. Two AXI interface addresses of the DDR are decoded by using the highest-order bit by default (initial default). According to the example in the figure, the master devices are numbered, the address of the master device 0 is numbered as 00, the address of the master device 1 is numbered as 01, the address of the master device 2 is numbered as 10, the address of the master device 3 is numbered as 11, the master devices 0-1 use one channel (a left channel in the figure), and the master devices 2-3 use the other channel (a right channel in the figure). After transmission begins, as shown in FIG. 5, in the channel, the data traffic used by the master devices 2-3 is greater than the data traffic used by the master devices 0-1, that is, the traffic of the master device 2 and the master device 3 is greater than the traffic of the master device 0 and the master device 1. When the depth difference between the outstanding transmission queues of the two AXI interfaces exceeds the preset threshold, statistics are made on the bit value on the same position of the device ID in each data information in the right transmission interface with the largest outstanding transmission depth, that is, statistics are made on the values of the bit positions of each column. After making statistics on 1s and 1s of each bit position of the ID, it is found that on a seventh-order bit position there are four 0s and four 1s, and the difference between the number of 1s and the number of 1s is the smallest, which indicates that the traffic of the master device 2 (having an address of 10) is substantially equivalent to the traffic of the master device 3 (having an address of 11). At this time, the external decoder is triggered to switch the position of the decoding bit. As shown in FIG. 6, the decoding position is changed, the seventh-order bit with an extended 8-bit address is decoded, that is, the master device 0 and the master device 2 use one AXI interface (the left channel in FIG. 6), the master device 1 and the master device 3 use the other AXI interface (the right channel in FIG. 6), and the master device 2 and the master device 3 are distributed to two AXI interfaces, where the master device 2 and the master device 3 have high traffic. Thereafter, each time when the depth difference of outstanding transmission between the two AXI interfaces is greater than or equal to the preset threshold, the decoder may automatically switch the decoding address, so as to meet the requirement on distribution to the two AXI interfaces of the DDR.

Furthermore, the method according to the embodiment of the present invention may be applied to equalizing the data information traffic of three, four, or more AXI interfaces of the DDR, and after the number of the AXI interface is increased, the ID width for distributing the traffic is correspondingly extended to $Log_2 N$ (N is the number of the transmission interfaces).

Figure 7:
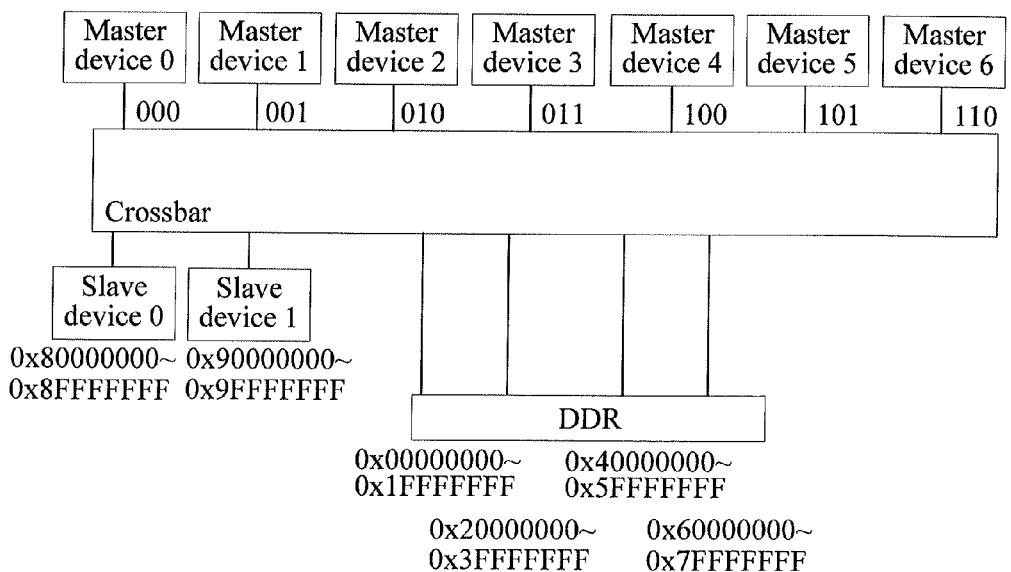
FIG. 7 is a first schematic diagram of an example of a method for equalizing data information traffic according to an embodiment of the present invention.
Figure 8:
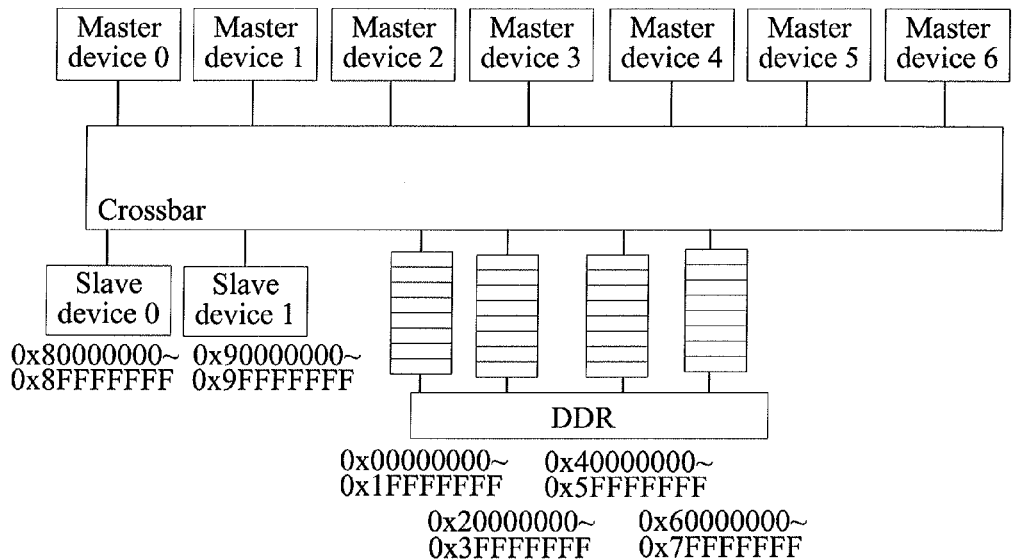
FIG. 8 is another schematic diagram of an example of a method for equalizing data information traffic according to an embodiment of the present invention.
Figure 9:
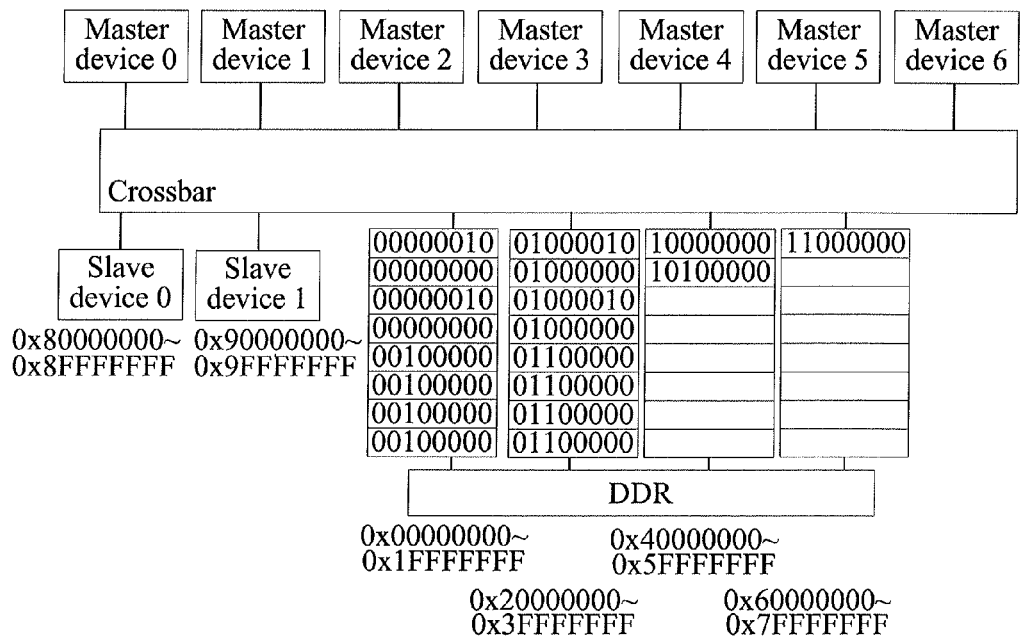
FIG. 9 is still another schematic diagram of an example of a method for equalizing data information traffic according to an embodiment of the present invention.

For example, the extended application of the embodiment of the present invention in the crossbar (DDR has four AXI interfaces) is taken as an example for description. The method according to the embodiment of the present invention is used to access the four AXI interfaces of the DDR for reading and writing DDR, and decoding is performed on the basis of a 32-bit address signal of the system. The crossbar has seven master devices and two slave devices, the original ID of the master device is 5 bits, and the master device is coded by the crossbar as 3 bits, so the ID of the master device on the crossbar is 8 bits. FIG. 7 shows an example of the present invention, and it can be seen that the address of the master device is defined as eight addresses such as (000), (001) and (010). The 8-bit ID of the master device is added into the address for decoding, that is, the decoding address is 8+32=40 bits, and the addresses of Slave 0 and Slave 1 are decoded and extended to 64 bits, that is, regardless of the largest 8-bit value, decoding is performed according to the low-order 32-bit original address. The four AXI interface address of the DDR is decoded by using the highest-order two bits by default. According to the example in FIG. 8, the master devices are numbered, that is, the master devices 0-1 use an AXI interface a, the master devices 2-3 use an AXI interface b, the master devices 4-5 use an AXI interface c, and the master device 6 uses an AXI interface d. After transmission begins, the traffic of the master devices 0, 1, 2 and 3 are compared with each other, as shown in FIG. 9, the interfaces a-d are arranged from left to right in sequence, and when the depth difference between two transmission interfaces in the transmission queues of the four AXI interfaces is greater than or equal to the preset threshold, for example, the depth difference of the interface a and the interface c is greater than or equal to the preset threshold, or the depth difference of the interface b and the interface d is greater than or equal to the preset threshold, statistics are made on the data traffic of the interfaces (the interface a and the interface b) with the largest depth difference. After statistics on 1s and 0s of each bit position of the ID is made, it is found that on a sixth-order bit positions of the interface there are four 0s and four 1s, and the difference between the number of 0s and the number of 1s is the smallest, which indicates that the traffic of the master device 0 and the master device 1 is relatively large and balanced; a sixth-order bit position of the interface b has four 0s and four 1s, and the difference between the number of 0s and the number of 1s is the smallest, which indicates that the traffic of the master device 2 and the master device 3 is relatively large and balanced. At this time, the external decoder is triggered to switch the position of the decoding bit. The decoding position is changed, the bit value on the sixth-order bit position of the extended 8-bit address is decoded, that is, the master devices 0 and 4 use an AXI interface, the master devices 1 and 5 use an AXI interface, the master devices 2 and 6 use an AXI interface, the master device 3 uses an AXI interface, and the traffic of the master devices is substantially distributed to four AXI interfaces evenly. Thereafter, each time when the depth difference of outstanding transmission between any two AXI interfaces in the four AXI interfaces is greater than or equal to the preset threshold, the decoder may automatically switch the address, so as to meet the requirement on distribution to the four AXI interfaces of the DDR.

The AXI interfaces are allocated for the data information according to the decoding result of decoding the bit value on the designated bit position in the received data information, and the designated bit position is changed when the traffic of the transmission interfaces is not balanced, and interface allocation is performed by using the decoding result of the designated bit position after changing, so as to balance the data information traffic, so that the present invention does not involve the modification of the master devices, and can achieve even allocation of the data information traffic in two channels of the DDR without significantly increasing the cost. As a result, the transmission efficiency is improved, the data processing speed is increased, and resources conservation is achieved.

Figure 10:
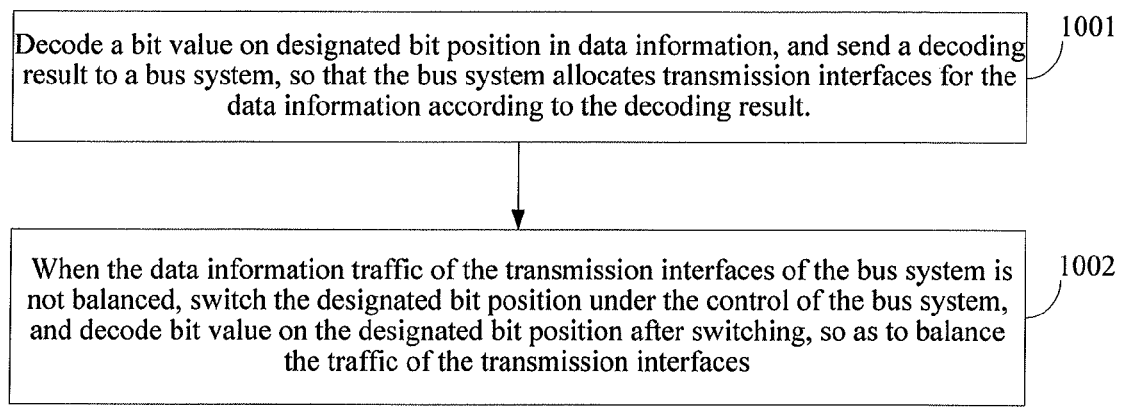
FIG. 10 is a flow chart of a method for equalizing data information traffic according to an embodiment of the present invention.

Furthermore, in order to improve the transmission efficiency and increase the data information processing speed, an embodiment of the present invention provides a method for equalizing data information traffic. As shown in FIG. 10, the method includes the following steps.

1001: Decode a bit value on designated bit position in data information, and send a decoding result to a bus system, so that the bus system allocates transmission interfaces for the data information according to the decoding result.

1002: When the data information traffic of the transmission interfaces of the bus system is not balanced, switch the designated bit position under the control of the bus system, and decode bit value on the designated bit position after switching, so as to balance the traffic of the transmission interfaces.

The AXI interfaces are allocated for the data information according to the decoding result of decoding the bit value on the designated bit position in the received data information, and the designated bit position is changed when the traffic of the transmission interfaces is not balanced, and interface allocation is performed by using the decoding result of the designated bit position after changing, so as to balance the data information traffic, so that the present invention does not involve the modification of the master devices, and can achieve even allocation of the data information traffic in two channels of the DDR without significantly increasing the cost. As a result, the transmission efficiency is improved, the data processing speed is increased, and resources conservation is achieved.

Figure 11:
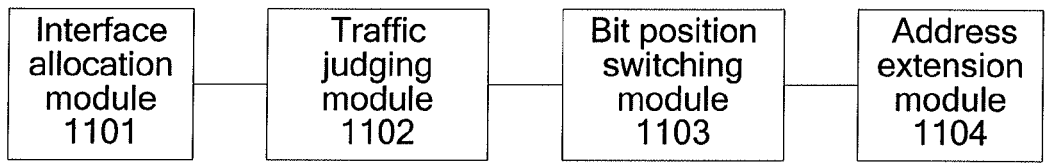
FIG. 11 is a schematic structural diagram of a bus system for equalizing data information traffic according to an embodiment of the present invention.

Furthermore, in order to improve the transmission efficiency and increase the data information processing speed, an embodiment of the present invention provides a bus system for equalizing data information traffic. As shown in FIG. 11, the bus system includes:

an interface allocation module 1101, configured to allocate transmission interfaces for data information according to a decoding result of decoding bit value on a designated bit in the data information, where the data information carries a device ID, the device ID includes a master device number and an internal data stream number of a master device, and the designated bit position is one of the bit positions in the device ID;

a traffic judging module 1102, configured to judge whether the data information traffic of the transmission interfaces is balanced; and a bit position switching module 1103, configured to control the decoder to switch the designated bit when the data information traffic of the transmission interfaces is not balanced, so that the decoder decodes the bit value on the designated bit position after switching, so as to balance the traffic of the transmission interfaces.

The bus system further includes:

an address extension module 1104, configured to write the device ID of the master device that initiates transmission into an address bit of the data information, so as to obtain an extended address bit.

The traffic judging module 1102 includes:

a traffic monitoring unit, configured to monitor the data information traffic of the transmission interfaces according to a depth of outstanding transmission of the transmission interfaces; and a traffic judging unit, configured to judge whether a depth difference between outstanding transmission of any two transmission interfaces in the transmission interfaces is greater than or equal to a preset threshold, and if the depth difference is greater than or equal to the preset threshold, the data information traffic of the transmission interfaces is not balanced; and if the depth difference is less than the preset threshold, the data information traffic of the transmission interfaces is balanced.

The bit position switching module 1103 includes:

a bit statistics unit, configured to make statistics on bit values on the same position of the device ID in each data information in the transmission interface with the largest outstanding transmission depth; and a bit position switching unit, configured to control the decoder to switch the designated bit position to a position with the smallest difference between the number of 0s and the number of 1s; when the number of the transmission interfaces is larger than two, the width of the internal data stream number of the master device is $Log_2 N$, where N is the number of the transmission interfaces.

The designated bit position may be any bit position of the device ID of the master device when the data transmission is started.

The bus system according to this embodiment and the method embodiments belong to the same concept, and the specific implementation procedure of the bus system is as described in the method embodiments, and will not be repeated herein.

The AXI interfaces are allocated for the data information according to the decoding result of decoding the designated bit in the received data information, and the designated bit position is changed when the traffic of the transmission interfaces is not balanced, and interface allocation is performed by using the decoding result of bit value on the designated bit position after changing, so as to balance the data information traffic, so that the present invention does not involve the modification of the master devices, and can achieve even allocation of the data information traffic in two channels of the DDR without significantly increasing the cost. As a result, the transmission efficiency is improved, the data processing speed is increased, and resources conservation is achieved.

Figure 12:
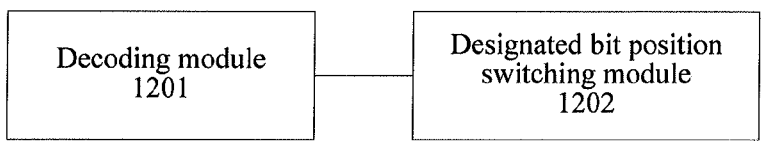
FIG. 12 is a schematic structural diagram of a decoder according to an embodiment of the present invention.

Furthermore, in order to improve the transmission efficiency and increase the data information processing speed, an embodiment of the present invention provides a decoder. As shown in FIG. 12, the decoder includes:

a decoding module 1201, configured to decode a bit value on a designated bit position in data information, and send a decoding result to a bus system, so that the bus system allocates transmission interfaces for the data information according to the decoding result; and a designated bit position switching module 1202, configured to switch the designated bit position under the control of the bus system when the data information traffic of the transmission interfaces of the bus system is not balanced, so that the decoding module decodes a bit value on the designated bit position after switching, so as to balance the traffic of the transmission interfaces.

The decoder according to this embodiment and the method embodiments belong to the same concept, and the specific implementation procedure of the decoder is as described in the method embodiments, and will not be repeated herein.

The AXI interfaces are allocated for the data information according to the decoding result of decoding the designated bit in the received data information, and the designated bit position is changed when the traffic of the transmission interfaces is not balanced, and interface allocation is performed by using the decoding result of the designated bit after changing, so as to balance the data information traffic, so that the present invention does not involve the modification of the master devices, and can achieve even allocation of the data information traffic in two channels of the DDR without significantly increasing the cost. As a result, the transmission efficiency is improved, the data processing speed is increased, and resources conservation is achieved.

All or a part of the technical solutions according to the embodiments of the present invention may be implemented by a program instructing relevant hardware. The program may be stored in a readable storage medium, and the storage medium may be any medium that is capable of storing program codes, such as a Read-Only Memory (ROM), a Random Access Memory (RAM), a magnetic disk, or an optical disk.

The above descriptions are merely exemplary embodiments of the present invention, but not intended to limit the present invention. Any modification, equivalent replacement, or improvement made without departing from the spirit and principle of the present invention should fall within the protection scope of the present invention.

What is claimed is:

1. A method for equalizing data information traffic, comprising:

receiving data information sent by a device;

decoding the data information by decoding a bit value in a first designated bit position in the data information, wherein the data information carries a device ID, and the first designated bit position occupies at least one bit position in the device ID;

allocating at least two transmission interfaces for the data information according to a decoding result;

determining whether the data information traffic of the at least two transmission interfaces is balanced after the allocating; and when the data information traffic of the at least two transmission interfaces is not balanced, switching the first designated bit position to a second designated bit position, and decoding a bit value on the second designated bit position, so as to balance the traffic of the at least two transmission interfaces by allocating the at least two transmission interfaces using at least a second decoding result of the second designated bit position after the switching.

2. The method according to claim 1, before the allocating the transmission interfaces for the data information according to the decoding result of decoding the bit value on the first designated bit position in the data information, further comprising:

writing a device ID of a master device that initiates transmission of the data information into an address bit of the data information, so as to obtain an extended address bit.

3. The method according to claim 2, wherein the transmission interface is an Advanced Extensible Interface (AXI), and when the number of the AXI interfaces is greater than two, the width of an internal data stream number of the master device is the integral part of Log 2N, wherein N is the number of the transmission interfaces.

4. The method according to claim 1, wherein the determining whether the data information traffic of the at least two transmission interfaces is balanced comprises:

monitoring the data information traffic of the at least two transmission interfaces according to a depth of outstanding transmission of the at least two transmission interfaces; and determining a magnitude relation of a depth difference between outstanding transmission of any two transmission interfaces in the at least two transmission interfaces and a preset threshold, and if the depth difference is greater than the preset threshold, the data information traffic of the transmission interfaces is not balanced; if the depth difference is less than the preset threshold, the data information traffic of the transmission interfaces is balanced; and if the depth difference is equal to the preset threshold, the data information traffic of the transmission interfaces is balanced or not balanced.

5. The method according to claim 4, wherein the switching the designated bit position comprises:

generating statistics on a plurality of designated bit values located at the same designated bit position of the device IDs in each data information in the transmission interface with the largest outstanding transmission depth in the at least two transmission interfaces, and switching the designated bit position to a position with the smallest difference between the number of 0s and the number of 1s at the designated bit position of each device ID.

6. The method according to claim 1, wherein the device ID comprises a device number and an internal data stream number of a device.

7. A method for equalizing data information traffic, comprising:

decoding a bit value on a first designated bit position in data information, and sending decoding results to a bus system, so that the bus system allocates transmission interfaces for the data information according to the decoding result; and when the data information traffic of the transmission interfaces of the bus system is not balanced, switching the first designated bit position to a second designated bit position under the control of the bus system, and decoding a bit value on the second designated bit position after switching to determine a second decoding result, so as to balance the data information traffic of the transmission interfaces by allocating the transmission interfaces and to further balance the data information traffic of the transmission interfaces using at least the second decoding result of the second designated bit position after the switching.

8. A bus system for equalizing data information traffic, comprising:

an interface allocation module, configured to decode the data information by decoding a bit value in a first designated bit position in the data information, wherein the data information carries a device ID, and the first designated bit position occupies at least one bit position in the device ID, and allocate transmission interfaces for data information according to the decoding;

a traffic judging module, configured to determine whether the data information traffic of the transmission interfaces is balanced after the allocating; and a bit position switching module, configured to switch the designated bit position when the data information traffic of the transmission interfaces is not balanced, and decode a bit value on the designated bit position after switching, so as to balance the traffic of the transmission interfaces by allocating the transmission interfaces using a result of the decoding of the designated bit position after the switching.

9. The bus system according to claim 8, wherein the bus system is an Advanced Extensible Interface (AXI) system, and further comprises:

an address extension module, configured to write a device ID of a master device that initiates transmission into an address bit of the data information, so as to obtain an extended address bit.

10. The bus system according to claim 8, wherein the traffic judging module comprises:

a traffic monitoring unit, configured to monitor the data information traffic of the transmission interfaces according to a depth of outstanding transmission of the transmission interfaces; and a traffic judging unit, configured to determine a magnitude relation of a depth difference between outstanding transmission of any two transmission interfaces in the transmission interfaces and a preset threshold, and if the depth difference is greater than the preset threshold, the data information traffic of the transmission interfaces is not balanced; if the depth difference is less than the preset threshold, the data information traffic of the transmission interfaces is balanced; and if the depth difference is equal to the preset threshold, the data information traffic of the transmission interfaces is balanced or not balanced.

11. The bus system according to claim 8, wherein the bit position switching module comprises:

a bit statistics unit, configured to generate statistics on a plurality of bit values located at the same position of the device IDs in each data information in the transmission interface with the largest outstanding transmission depth; and a bit position switching unit, configured to switch the designated bit position to a position with the smallest difference between the number of 0s and the number of 1s at the designated bit position of each device ID.

12. The bus system according to claim 8, wherein when the number of the transmission interfaces is greater than two, the width of an internal data stream number of the master device is Log 2N, wherein N is the number of the transmission interfaces.

13. A decoder, comprising:
- a decoding module, configured to decode a bit value on a designated bit at a first designated bit location in data information, and send a decoding result to a bus system, so that the bus system allocates transmission interfaces for the data information according to the decoding result; and
- a designated bit position switching module, configured to switch the designated bit position to a second designated bit location under the control of the bus system when the data information traffic of the transmission interfaces of the bus system is not balanced, so that the decoding module decodes a bit value on the second designated bit position after switching, so as to balance the traffic of the transmission interfaces by allocating the transmission interfaces using at least a second decoding result of the second designated bit position after the switching.

* * * * *